Figure 1:
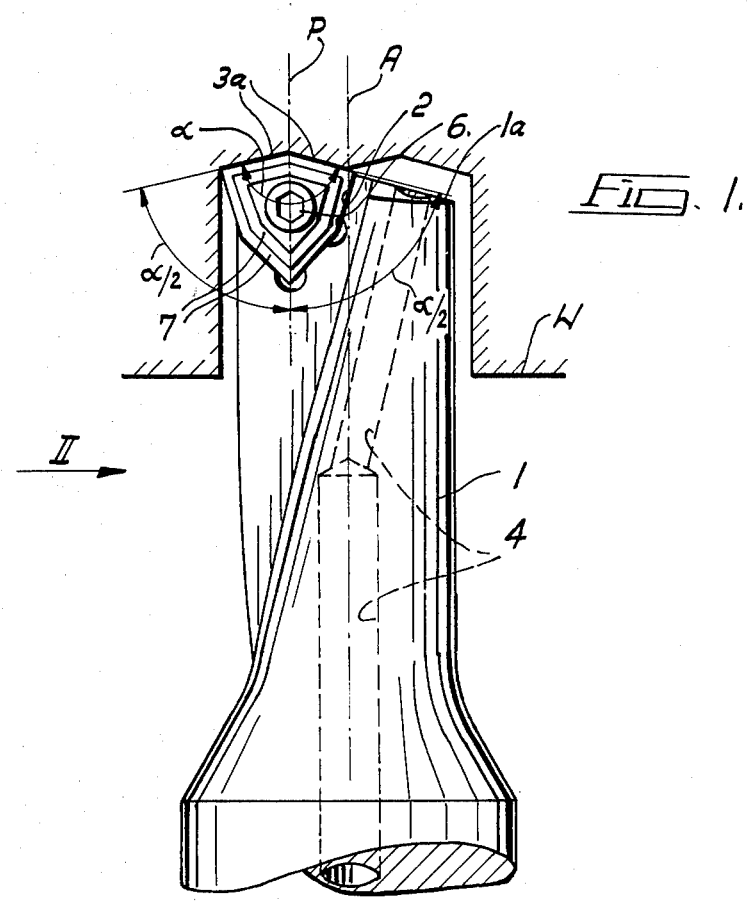

United States Patent [19]

Eckle

[11] 4,230,429

[45] Oct. 28, 1980

[54] BORING TOOL FOR MAKING BORINGS IN SOLID METAL MATERIAL OF WORKPIECES

[75] Inventor: Otto Eckle, Löchgau, Fed. Rep. of Germany

[73] Assignee: Komet Stahlhalter- und Werkzeugfabrik Robert Breuning GmbH, Besigheim, Fed. Rep. of Germany

[21] Appl. No.: 920,532

[22] Filed: Jun. 29, 1978

[30] Foreign Application Priority Data

Jul. 6, 1977 [DE] Fed. Rep. of Germany ....... 7721135

[51] Int. Cl.$^3$ ............................................. B23B 51/00
[52] U.S. Cl. .................................... 408/186; 408/223; 408/228; 408/713
[58] Field of Search ................ 408/216, 223, 227–229, 408/59, 713, 705, 186; 407/42, 51, 56

[56] References Cited

U.S. PATENT DOCUMENTS

| 3,304,815 | 2/1967 | Faber | 408/59 |
| 3,422,706 | 1/1969 | Lunsford | 408/59 |
| 3,540,323 | 11/1970 | Rishel | 408/186 |
| 3,816,018 | 6/1974 | Hlocky | 408/713 |
| 3,963,366 | 6/1976 | Eckle et al. | 408/713 |
| 4,149,821 | 4/1979 | Faber | 408/705 |

FOREIGN PATENT DOCUMENTS 1353391  1/1964  France ....................................... 408/59

*Primary Examiner*—Leonidas Vlachos
*Attorney, Agent, or Firm*—Blanchard, Flynn, Thiel, Boutell & Tanis

[57] ABSTRACT

In a boring tool for making borings in solid metal material of workpieces, at least one cutting bit is interchangeably arranged in a recess, at the end of the borer shank. The polygonal cutting bit has a plurality of cutting edges of equal length, of which two are in engagement with the workpiece at each time. For the purposes of improved centering of the borer, these two operative cutting edges each form approximately the same angle to a line parallel to the borer axis. A plurality of cutting bits at different radial distances may also be arranged in the boring tool, with two cutting edges of each cutting bit being in engagement with the workpiece and the working regions of the cutting edges of adjacent cutting bits each overlapping somewhat.

8 Claims, 5 Drawing Figures

BORING TOOL FOR MAKING BORINGS IN SOLID METAL MATERIAL OF WORKPIECES

The invention relates to a boring tool for making borings in solid metal material of workpieces, comprising a shank and at least one interchangeable cutting bit which is arranged in a recess at the end of the shank and which has a plurality of cutting edges of equal length, of which two are engaged with the workpiece at each time and of which one cutting edge directly adjoins the borer axis or extends slightly therebeyond.

In a known boring tool of this kind, two cutting bits are arranged on the same radius. The cutting bits are of a pentagonal shape, and, on the inner cutting bit, two adjacent cutting edges are operative at each time, while on the outer cutting bit, only one cutting edge is in engagement with the workpiece. The working regions of the cutting edges of the radially inward cutting bit adjoin the working region of the cutting edge of the radially outward cutting bit. The cutting edges of the cutting bits in the known boring tool are arranged in a fairly haphazard manner. Thus, one operative cutting edge of the radially inward cutting bit extends at an angle of 72° to a line which is parallel to the borer axis, and the adjoining cutting edge extends at an angle of 37° relative to the line parallel to the borer axis. Because the two cutting edges are arranged at different angles relative to the line parallel to the boring axis, the cutting edges are also subjected to different loadings. Only one cutting edge of the radially outward cutting bit is operative, this cutting edge extending at an angle of 72° to a line parallel to the borer axis, so that this cutting bit is also loaded at one side. As moreover both the cutting bits are arranged on the same radius, considerable forces are produced, which would tend to deflect the boring tool sideways from the borer axis. In order to prevent deflection of this kind, which would result in a bore with a curved axis, a first support roller which is rotatable about a line parallel to the borer axis is arranged at the side remote from the cutting bits, being disposed on the same diameter as the cutting bits. A further roller of this kind is provided below the cutting bits, being displaced through 90° in the peripheral direction. The two support rollers bear against the wall of the bore and are intended thereby to prevent lateral deviation of the boring tool. However, the support rollers cause this known tool to be of a relatively complicated construction. There is also the danger that fine chips may pass between the support rollers and the wall of the bore, with the result not only that the wall of the bore suffers damage but also that the accuracy of the bore is affected, as then the boring tool is deflected in the opposite direction. Even with tools of larger diameters, it is difficult to mount a plurality of cutting bits as they would all have to be arranged one beside the other on the same diameter.

The conventional spiral drills which are generally made from highspeed cutting steel are also known, for the purposes of making bores in solid metal material. However, when making borings of larger diameters, only low levels of cutting efficiency are achieved with such drills, because of the restricted cutting speed. Also, drills are only suitable for making a bore of quite specific diameter. For the purposes of making a bore which is to be only 1/10 mm greater in diameter, it is either necessary to use another drill, or the bore must be subsequently turned out by a separate turning tool. Furthermore, drills are only suitable for making relatively coarse and imprecise bores.

The invention is based on the problem of providing a boring tool for making borings in solid metal material of workpieces, of the kind set out above, which is of a simple construction, which has a high degree of working precision with a high boring capacity, which permits finishing operations on bores, and which can also be used for bores whose diameter is somewhat greater than the normal working diameter of the boring tool. According to the invention, this is achieved in that the two cutting edges (operative cutting edges) of each cutting bit, which are engaged with the workpiece at each time, each form approximately the same angle to a line parallel to the borer axis.

It has been found that a quite surprising result is achieved by this comparatively simple measure. Indeed, with the boring tool according to the invention, it is possible to make very precise and straight bores, with a high boring output. It is assumed that this is to be attributed to the fact that, because of the symmetrical arrangement of the two operative cutting edges, approximately the same cutting forces act on these two cutting edges, so that the boring tool is deflected neither radially inwardly nor radially outwardly. As the cutting bit comprises hard metal, the cutting speed attained is about five times as high as the cutting speed of a spiral drill. In addition, the cutting bit does not need to be re-ground for, after two cutting edges are worn, the cutting bit is simply released, turned about its own axis by a given amount so that two new cutting edges are in the operative positions, and is then re-screwed in place. The novel boring tool is of substantially simpler construction than the boring tool of the construction first set out above, namely all support rollers can be omitted. This means that the disadvantages of damage to the wall of the bore, caused by the support rollers, also disappear. A particular advantage however is that other operations can be carried out with the tool according to the invention, besides a boring operation proper. Thus for example after the bore has been made in the solid material, the bore may subsequently be subjected to a finishing treatment if the machine tool permits radial displacement of the borer axis with respect to the axis of the bore. This however is the case in most machine tools. On machine tools of this kind, it is then possible, with the boring tool according to the invention, to provide an eccentric relief at the bottom of the bore, by moving the boring tool somewhat radially outwardly, relative to the axis of the bore. A relief turning operation of this kind is of advantage when the inside wall of the bore is subsequently to be ground. In addition however it is possible to use the boring tool according to the invention to perform facing turning operations and to break edges at the mouth of the bore and at the outer periphery of the workpiece. A further advantage in comparison with a spiral drill is that the use of low-cost hard metal cutting bits having a plurality of cutting edges makes it unnecessary to perform expensive re-grinding operations.

The boring tool according to the invention may be provided not only with one cutting bit but with two or three cutting bits for making bores of larger diameter. In order to achieve a uniform distribution of force and thus a high degree of working precision, it is important that all the cutting bits are arranged at the same angular spacings and that the cutting edges of each radially further outwardly arranged cutting bit are also engaged with the workpiece and that these two operative cutting edges each form the same angle to a line parallel to the borer axis. This provides that, at each of the cutting bits, the radially inwardly acting and the radially outwardly acting forces cancel each other out. By for example making the cutting edges of the radially further outward cutting bits somewhat shorter than those of the radially further inward cutting bits, it is also possible to provide that approximately the same cutting forces act on each cutting bit. As the cutting bits are arranged at equal angular spacings, the tool is not deflected in any direction away from the borer axis, and an extremely precise and straight bore is produced.

It is of particular advantage for the two operative cutting edges to form an obtuse angle of 120° to 170° to each other, preferably an angle of about 156°. The obtuse tip angle of the two adjacent operative cutting edges gives them an excellent degree of resistance, while a certain stabilising effect is achieved by virtue of the two operative cutting edges being inclined at an acute angle with respect to the line parallel to the borer axis.

It is particularly advantageous for each of the cutting bits to be of a hexagonal configuration, wherein at each second corner the two adjacent cutting edges form an angle of about 156° to each other, and each of the two operative cutting edges forms an angle of about 78° to the line parallel to the borer axis. The external form of a cutting bit of this kind is in fact previously known in principle, but not the symmetrical arrangement of the two operative cutting edges with respect to a line parallel to the borer axis. Using the above-mentioned angles not only provides a particularly good boring capacity, but in addition the boring tool according to the invention may also be used universally for further work which is to be carried out subsequently to the production of the bore, so that no tool is required for this. More detailed reference to this is made in the specific description hereinafter.

As the boring tool according to the invention has a high operating capacity, a larger amount of chips is also produced. To achieve the high degree of operating precision, it is therefore also important for the chips to be properly removed. Otherwise chips may become wedged between the tool shank and the wall of the bore, and this results not only in the boring tool being deflected laterally from the axis of the bore, but also in damage to the wall of the bore. In order to ensure good chip removal in this way, and thus also to improve the operating precision and to increase the operating speed, a chip channel is associated with each cutting bit, the chip channel opening in front of the chip surfaces of the respective cutting bit and being in a spiral configuration in the direction of rotation and forward feed. In addition, the supply of cutting and cooling fluid is advantageously effected through a passage arranged in the shank of the boring tool. The fluid serves not only to cool the cutting bits and the workpiece, but it also helps in removing the chips, insofar as it flushes the chips out of the bore.

Figure 2:
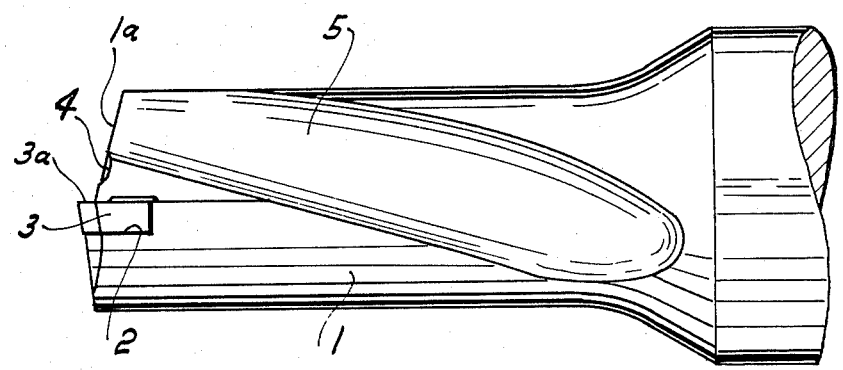
Figure 3:
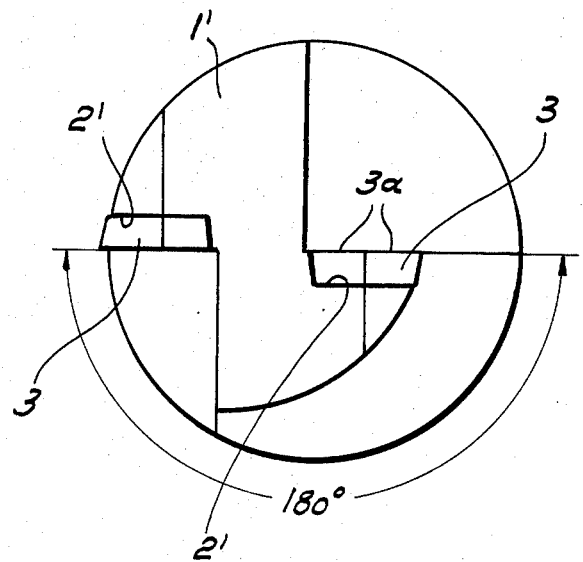
Figure 4:
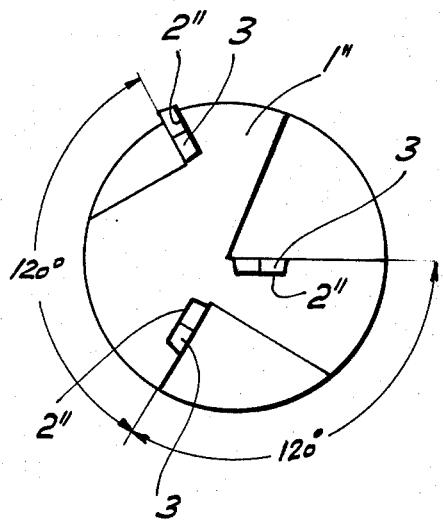
Figure 5:
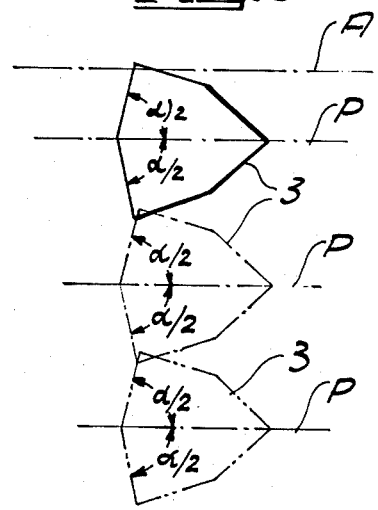

The invention is described in greater detail hereinafter with reference to a number of embodiments shown in the drawing, in which:

FIG. 1 shows a plan view of a first embodiment of the boring tool according to the invention, with one cutting bit, FIG. 2 shows a side view in the direction II in FIG. 1, FIG. 3 shows an end view of a boring tool with two cutting bits, FIG. 4 shows an end view of a boring tool with three cutting bits, and FIG. 5 shows the conditions of engagement of the individual cutting edges in a boring tool as shown in FIG. 4.

In the embodiment shown in FIG. 1, the shank 1 of the boring tool has at its end a recess 2 for receiving a hexagonal cutting bit 3 of hard metal or cemented carbide. A cooling agent may be supplied to the end 1a by way of a cooling agent bore 4. The boring tool may be arranged stationary, with the workpiece W rotating, or vice-versa. Arranging the borer axis A horizontally is preferred in this respect.

In the particularly advantageous embodiment illustrated, the cutting bit 3 is of such a configuration that two adjacent cutting edges 3a form an angle $\alpha$ of about 156° to each other, at each second corner. The cutting bit 3 is so arranged in the recess 2 that the two cutting edges 3a which are respectively in the operative position each form approximately the same angle $\alpha 2$, to a line P which is parallel to the borer axis. The symmetrical arrangement of the operative cutting edges results in the generation of forward feed pressures whose resultant is also parallel to the borer axis A. Accordingly, there are virtually no forward feed forces acting radially on the boring tool. The two cutting edges 3a which are in the engagement position guide the boring tool in a direction parallel to the axis.

The obtuse angle $\alpha$ also imparts excellent resistance to the cutting bit. The right-hand operative cutting edge 3a is so arranged that it projects towards the right slightly beyond the borer axis A, thereby to ensure that the cutting edge also cuts at the centre of the bore. The cutting member 3 also has two chip guide steps 7, in known manner.

The two operative cutting edges 3a are preferably so arranged that they form the same angle $\alpha/2$, in this case 76°, to the line P which is parallel to the borer axis A. Slight variations in this angle are permissible however, such as for example 80° on one side and 76° on the other side.

The tool according to the invention has previously proved to be an outstanding success in machining the most widely varying kinds of steel from steel 37 up to high-strength steel of about 100 kp/mm$^2$ strength, and also in aluminium and grey cast iron, while the machining capacity achieved was about 2.5 times that of normal spiral drills. However, the high degree of operating precision should also be particularly emphasised, for the bore also extends in a straight line within the permitted tolerances. As has already been mentioned above, machining should be effected in a horizontal feed direction, for the good removal of chips, in which case cooling fluid can be passed through the shank 1 and the bore 4, and contributing to flushing the chips out of the bore. In comparison with a normal drill, the boring tool according to the invention has the advantage that further machining operations can be performed subsequently to the production of the actual bore. Thus, it is possible to perform a finishing machining operation on the bore, and thus to machine the bore to any desired diameter, by displacing the borer axis A in the radial direction. It is also possible to perform an undercutting operation at the bottom of the bore, which is of advantage for subsequent grinding operations. The boring tool may also be used for breaking edges and also for face turning.

In order to improve the removal of chips, the tool according to the invention preferably has a chip channel 5, as shown in FIG. 2, which opens at the chip surfaces of the cutting bit 3 and which extends in a spiral in the direction of rotation and forward feed.

The embodiment shown in FIGS. 1 and 2 can be used for making bores of up to about 40 mm, depending on the size of the respective cutting bit 3 used. If larger bores are to be bored directly in solid material, then the tool shank 1', as shown in FIG. 3, may have two recesses 2' which are displaced through 180° relative to each other. A respective cutting bit 3 is arranged in each of the recesses 2', with two adjacent cutting edges 3' of each of the two cutting bits 3 being in engagement with the workpiece. The arrangement in this respect is also such that the cutting edges of the two cutting bits, that is to say also the cutting bit which lies further radially outwardly, each form approximately the same angle to a line parallel to the borer axis. The two cutting bits 3 are arranged so as to be displaced relative to each other in a radial direction, so that their operative regions overlap somewhat.

FIG. 4 shows a further embodiment in which three recesses 2" are provided on the shank 1", the recesses each being displaced through 120° relative to each other. In this boring tool also, two cutting edges of each of the three cutting bits are in the position of workpiece engagement, the cutting edges in the engagement position each being arranged symmetrically with respect to a line parallel to the borer axis. FIG. 5 shows the conditions of engagement of the cutting edges of the individual cutting bits. Reference A denotes the borer axis, while reference P denotes the line parallel to the borer axis. The operative regions of the three cutting bits which are arranged at varying radial distances from the borer axis overlap somewhat. The radially outwardly disposed cutting bits are set back axially somewhat relative to the radially further inwardly disposed cutting bits.

Finally, it should also be mentioned that the cutting bits are secured in the recess 2 in known manner, for example by a screw 6. After the screw 6 has been released, the cutting bit may be removed and turned through 1 20°, so that two new cutting edges can then be used.

The recess 2 on the shank 1 is advantageously so formed that as many as possible of the cutting edges of the cutting bit 3, which are not in the position of workpiece engagement, are surrounded by side walls of the recess 2. In this way, by virtue of the cutting edges which are not being used lying against the side walls of the recess, such cutting edges are protected from edge notching which could be caused by the chip discharge movement.

I claim:

1. A boring tool comprising a shaft and at least two cutting bits, each said bit being hexagonal with its cutting edges equally long and arranged in pairs, said cutting bits being exchangeable and each arranged in a respective recess facing in the direction of rotation of said shaft, each said cutting bit having one said pair of its said cutting edges arranged for simultaneous effective engagement with a workpiece, said pair of effective cutting edges of every cutting bit forming an obtuse angle (α) therebetween straddling a line parallel to the shaft axis and each defining substantially the same angle (α/2) with said line parallel to the shaft axis, wherein said cutting bits are circumferentially spaced at equal angular distances on said shaft, said cutting bits being located at different radial distances from the axis of said shaft and such that the operative region of the effective cutting edges of each cutting bit somewhat radially overlaps the operative region of the effective cutting edges of the radially adjacent cutting bit, and one effective cutting edge of the radially inner cutting bit borders directly on said shaft axis or slightly overlaps same, the radially outermost cutting bit having its radially outermost effective cutting edge of its pair of effective cutting edges extending radially outward beyond the shaft periphery and meeting the adjacent cutting edge of the adjacent cutting edge pair in a further angle less than said obtuse angle (α) such that said adjacent cutting edge angles away from and does not engage the peripheral wall of a hole bored by said tool and converges toward the axis of the shaft.

2. A boring tool according to claim 1, wherein said obtuse angle (α) formed by said pair of effective cutting edges of each cutting bit is in the range of 120° to 170°.

3. A boring tool according to claim 2, wherein at each second corner the two adjacent cutting edges form a said obtuse angle (α) of about 156° with respect to each other, and at each of said two effective cutting edges forms said same angle (α/2) of about 78° to said line parallel to said shaft axis.

4. A boring tool according to claim 3, including a chip channel associated with each cutting bit, said chip channel opening at the chip surfaces of the respective cutting bit and extending in a spiral configuration in the direction of rotation and forward feed along said shaft.

5. A boring tool according to claim 3, wherein for each cutting bit, those of said cutting edges which are not positioned for engagement with a workpiece are surrounded by sidewalls of the corresponding said recess.

6. A boring tool according to claim 1 wherein said shaft carries two said cutting bits circumferentially spaced 180° away from each other on said shaft, said two bits having substantially identical obtusely angled effective cutting edge pairs, said tool as seen upstanding from the side thereof having a free end profile including a first inverted V shape and a second inverted V shape, said first and second V shapes being the profiles of said effective cutting edge pairs of first and second cutting bits on said shaft, said V-shaped effective cutting edge pairs each pointing axially beyond said shaft free end with said first V-shaped cutting edge pair offset rightwardly from centered relation with the shaft axis but at least partly overlapping said shaft axis and said second V-shaped cutting edge pair being offset to the left of said shaft axis and said first V-shaped cutting edge pair by a space free of said cutting bits and wide enough that the point of said second V-shaped cutting edge pair is offset radially inward from the periphery of said shaft by less than half the width of said second V-shaped cutting edge pair, said V-shaped cutting edge pairs during rotation of said shaft defining a surface of revolution in the form of coaxial inner and outer V cross-section annular grooves with the inner said groove overlapping at least slightly the outer said groove.

7. A boring tool according to claim 1 including three said cutting bits circumferentially spaced at 120° from each other at the free end of said shaft, the first cutting bit being radially located to at least slightly overlap the shaft axis, the second cutting bit being spaced 120° circumferentially from the first and spaced between the axis and periphery of said shaft, the third cutting bit being spaced circumferentially 120° beyond said second cutting bit and slightly overhanging radially out beyond the periphery of said shaft, said third cutting bit when seen from the end of said shaft being spaced farther from said second cutting bit than from said first cutting bit, said effective cutting edge pairs of said three cutting bits upon rotation defining a surface of revolution comprised of three concentric, radially overlapping shallow V cross-section annular grooves.

8. A boring tool comprising a shaft and at least two cutting bits, each said bit having several equally long cutting edges, said cutting bits being exchangeable and each arranged in a respective recess facing in the direction of rotation of said shaft, each said cutting bit having two of its said cutting edges arranged for simultaneous effective engagement with a workpiece, said two effective cutting edges of every cutting bit each defining substantially the same angle with a line parallel to the shaft axis, wherein said cutting bits are circumferentially spaced at equal angular distances on said shaft, said cutting bits being located at different radial distances from the axis of said shaft and such that the operative region of the effective cutting edges of each cutting bit somewhat radially overlaps the operative region of the effective cutting edges of the radially adjacent cutting bit, and one cutting edge of the radially inner cutting bit borders directly on said shaft axis or slightly overlaps same, in which said cutting bits radially stepped out from said shaft axis are progressively narrower in the radial extent of their cutting edge pairs.

* * * * *